United States Patent [19]
Wilson et al.

[11] Patent Number: 5,386,299
[45] Date of Patent: Jan. 31, 1995

[54] METHOD AND APPARTUS FOR AUTOMATICALLY CALIBRATING CAMERAS USED FOR DOCUMENT SCANNING

[75] Inventors: Owen H. Wilson, Breslau; Geoffrey G. Marlow, Kitchener, both of Canada

[73] Assignee: NCR Corporation, Dayton, Ohio

[21] Appl. No.: 31,300

[22] Filed: Mar. 12, 1993

[51] Int. Cl.⁶ .................. H04N 1/00; H04N 1/46
[52] U.S. Cl. ................... 358/406; 358/504; 358/400
[58] Field of Search ........... 358/400, 401, 406, 487, 358/496, 498, 504

[56] References Cited

U.S. PATENT DOCUMENTS

| | | | |
|---|---|---|---|
| 3,816,659 | 6/1974 | Landsman | 358/480 |
| 5,099,341 | 3/1992 | Nosaki et al. | 358/461 |
| 5,124,810 | 6/1992 | Seto | 358/406 |
| 5,181,104 | 1/1993 | Sugishima et al. | 358/453 |
| 5,237,172 | 8/1973 | Lehman et al. | 358/496 |

Primary Examiner—Edward L. Coles, Sr.
Assistant Examiner—Kimberly A. Williams
Attorney, Agent, or Firm—Elmer Wargo

[57] ABSTRACT

A moveable member which is moveable between first and second positions relative to an optical axis of an imaging camera is used to calibrate the camera. The moveable member has a first reference member positioned at the optical axis when the moveable member is in the first position, and has a second reference member positioned at the optical axis when the moveable member is in the second position. A preferred embodiment has a first calibration device for a front camera and a second calibration for a rear camera when both the front and the rear of the document are to be imaged. A single actuator is used to simultaneously move both moveable members of the first and second calibration devices between the positions mentioned.

15 Claims, 4 Drawing Sheets

5,386,299

METHOD AND APPARTUS FOR AUTOMATICALLY CALIBRATING CAMERAS USED FOR DOCUMENT SCANNING

BACKGROUND OF THE INVENTION

1. Field of Invention

This invention relates to a method and apparatus for automatically calibrating cameras used for scanning documents as part of an imaging process.

2. Background Information

Document scanners are used to capture an image of a document as the document and the document scanner or "camera" are moved relative to each other. A typical document scanner scans a document to generate various levels of gray which are then thresholded into black and white pixels, for example. The resulting black and white pixels are then used to represent the image of the document.

Some of the problems with document scanners are that the scanners tend to age and collect dust which tend to distort the gray scale values generated by the scanners. As a result, the scanners need to be calibrated to correct the problems mentioned.

Two general methods for calibrating document scanners are as follows:

(1) Use a permanent white reference background or member which is mounted along a document track to be viewed by the scanner; and (2) Use a white reference card which is passed in front of the scanner during the calibration process.

There are certain limitations which are inherent in the two approaches mentioned:

(1) When a stationary white reference member is used, it is difficult to detect the leading edge of a document as the document is moved towards the optical axis of the document scanner, and it is also difficult to detect the height of the document against the background of the white reference member. With the passage of time, the white reference member becomes contaminated through the constant wear of documents passing thereover; and (2) Using a white reference card or document being fed in the document track relies on human intervention to calibrate the camera or document scanner and is subject to the experience level of the operator performing the calibration.

SUMMARY OF THE INVENTION

An object of this invention is to obviate the problems mentioned in the Background of the Invention.

Another object of this invention is to provide a low cost apparatus for calibrating a document scanner.

An advantage of this invention is that the reference members or surfaces which are used in the calibration process can be changed under the control of a controller which performs the calibration.

In a first aspect of this invention there is provided an apparatus comprising:

a moveable member moveable between first and second positions relative to an optical axis of an imaging device positioned at a document track;

said moveable member having a first reference member positioned relative to said optical axis when said moveable member is positioned in said first position, and said moveable member having a second reference member positioned relative to said optical axis when said moveable member is positioned in said second position; and an actuator mechanism for moving said moveable member between said first and second positions.

In a second aspect of this invention there is provided a method of providing a black reference member and a white reference member used in the process of calibrating an imaging device having an optical axis, said method comprising the steps of:

(a) providing a moveable member having said black and white reference members thereon; and (b) moving said moveable member to position said white reference member and said black reference member with regard to said optical axis as required by a controller calibrating said optical device.

The above advantages, and others, will be more readily understood in connection with the following specification, claims, and drawing.

DETAILED DESCRIPTION OF THE PREFERRED EMBODIMENT

Figure 1:
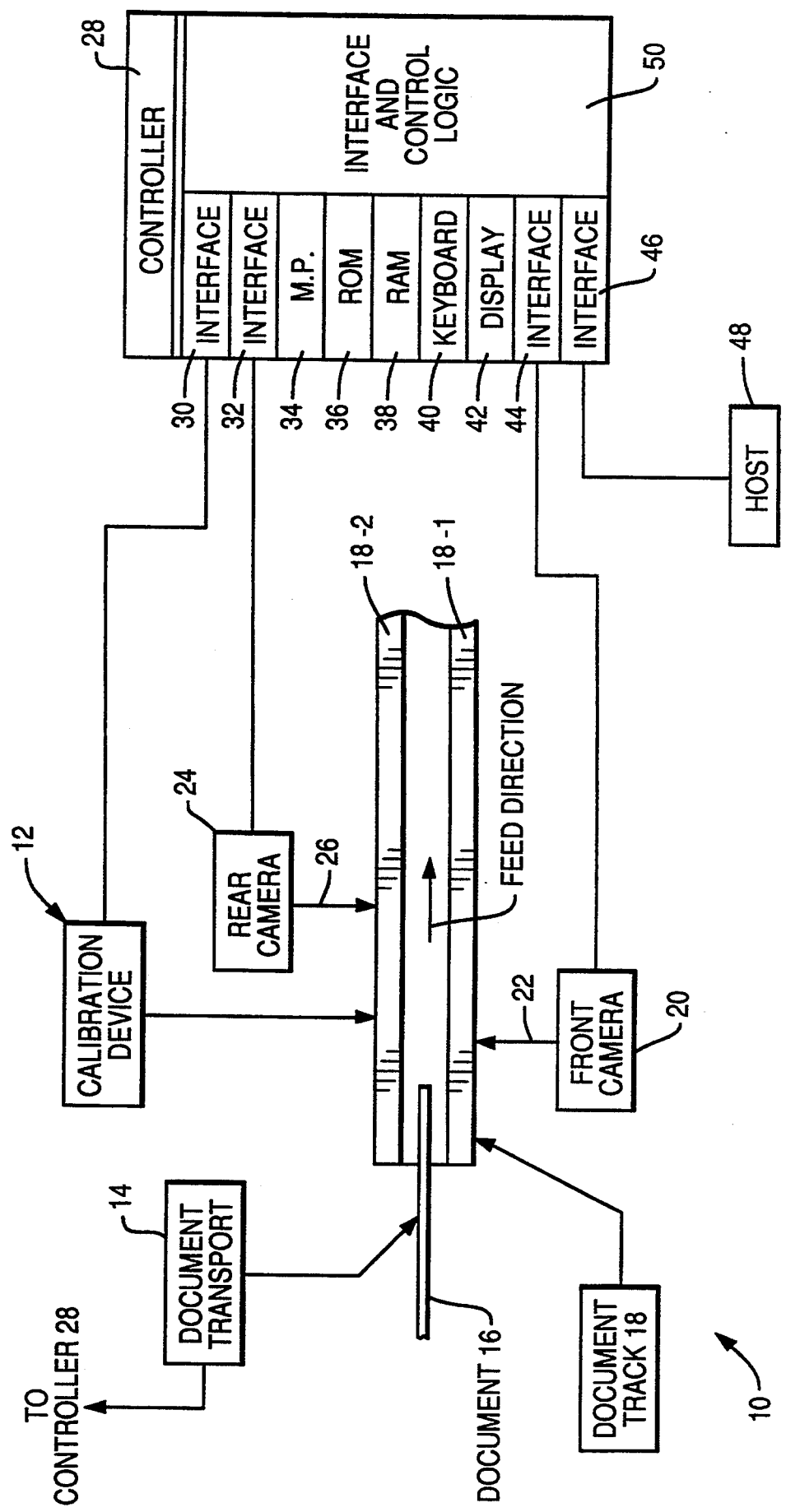
FIG. 1 is a schematic diagram showing the orientation of a calibration device or apparatus made according to a preferred embodiment of this invention.

FIG. 1 is a general schematic diagram of a system 10 in which a calibration apparatus or device 12, made according to a preferred embodiment of this invention, may be used. A document transport 14 is used to feed a document 16 in the feeding direction shown within a document track 18. The top long side of the document 16 is shown being fed between the upstanding front wall 18-1 and the upstanding rear wall 18-2 of the document track 18. A front document scanner (like a charge coupled device, for example) or front camera 20 is shown with its optical axis 22 being directed at the document track 18. Suitable openings (not shown) are present in the front wall 18-1 to enable light reflected from the calibration device 12 and the front side of a document 16 to be processed by the front camera 20. A similar arrangement exists for a rear camera 24 which has its optical axis 26 directed at the rear of the document 16.

The system 10 also may include a conventional controller 28 which is used to control the operations of the system 10 as will be described hereinafter. The controller 28 includes the following elements:

An interface 30 for coupling the calibration device 12 to the controller 28;

An interface 32 for coupling the rear camera 24 to the controller 28;

A microprocessor (M.P.) 34 for performing the required transactions;

A ROM 36 in which certain routines may reside;

A RAM 38 for processing data and into which certain programs may be downloaded, for example;

A keyboard (K.B.) 40 for entering data by a user of the system;

A display 42 for communication with a user of the system;

Interfaces 44 and 46 for coupling the controller 28 to the front camera 20 and a host 48, respectively; and Interface and control logic 50 which is used to interconnect the various elements mentioned. The form of the controller 28 shown is obviously not an accurate diagram of a controller, but it is used to show the functional relationships among the various elements mentioned. Certain of the elements, like the interfaces, may be combined to reduce the number of elements used; however, as mentioned, they are used to portray various functions associated with the controller 28. Because the controller 28, itself, may be conventional, further discussion about it is not deemed necessary.

Figure 3:
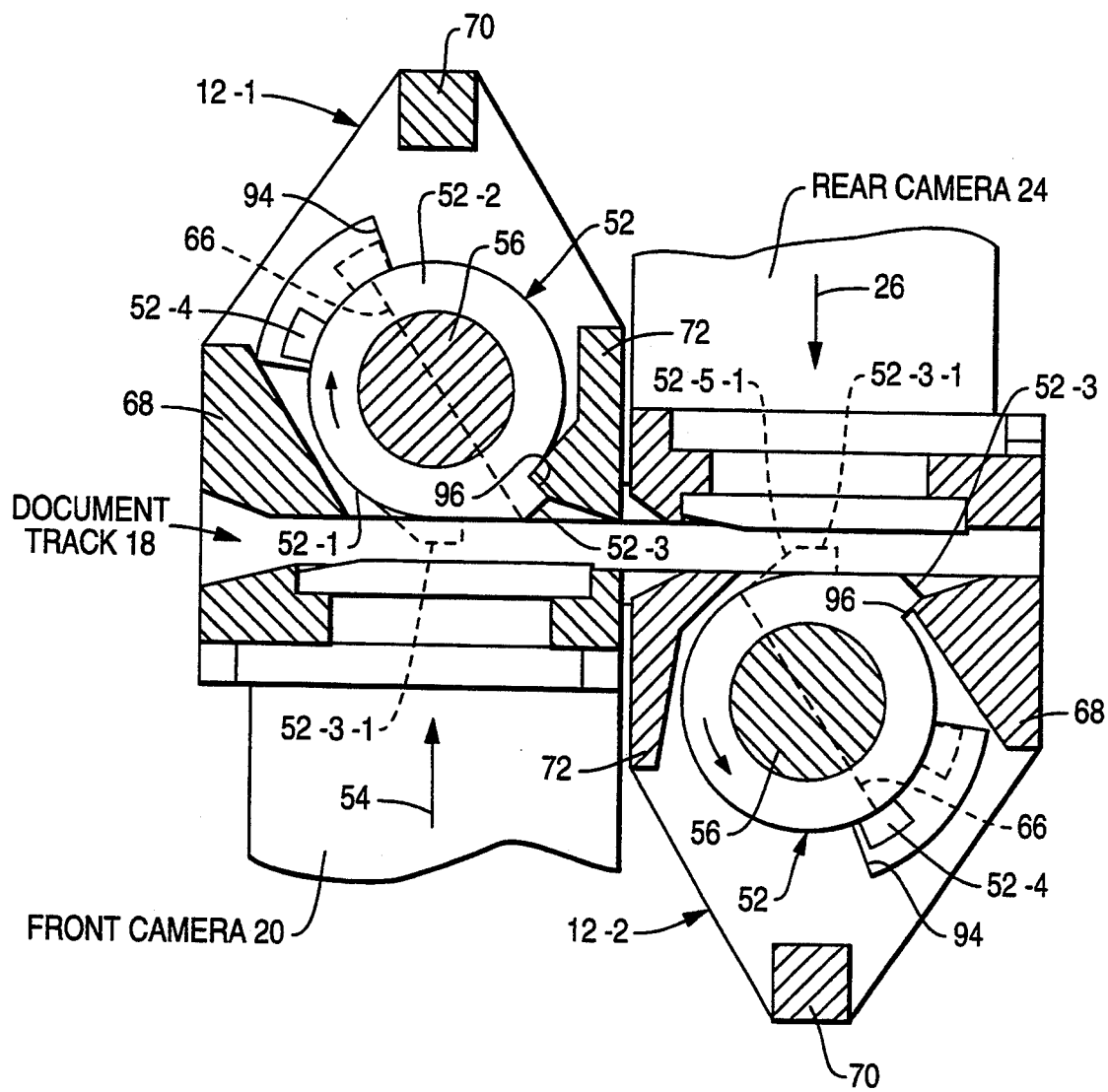
FIG. 3 is a general cross sectional view, taken along the general line 3—3 of FIG. 2, showing how the calibration device for a "front camera" or document scanner and the calibration device for a "rear camera" are aligned relative to their associated cameras.

The calibration device 12 shown in FIG. 1 may exist as a single calibration device 12-1 (associated with the front camera 20), for example, or it may also include a second calibration device 12-2 (associated with the rear camera 24), as shown in FIG. 3.

Figure 2:
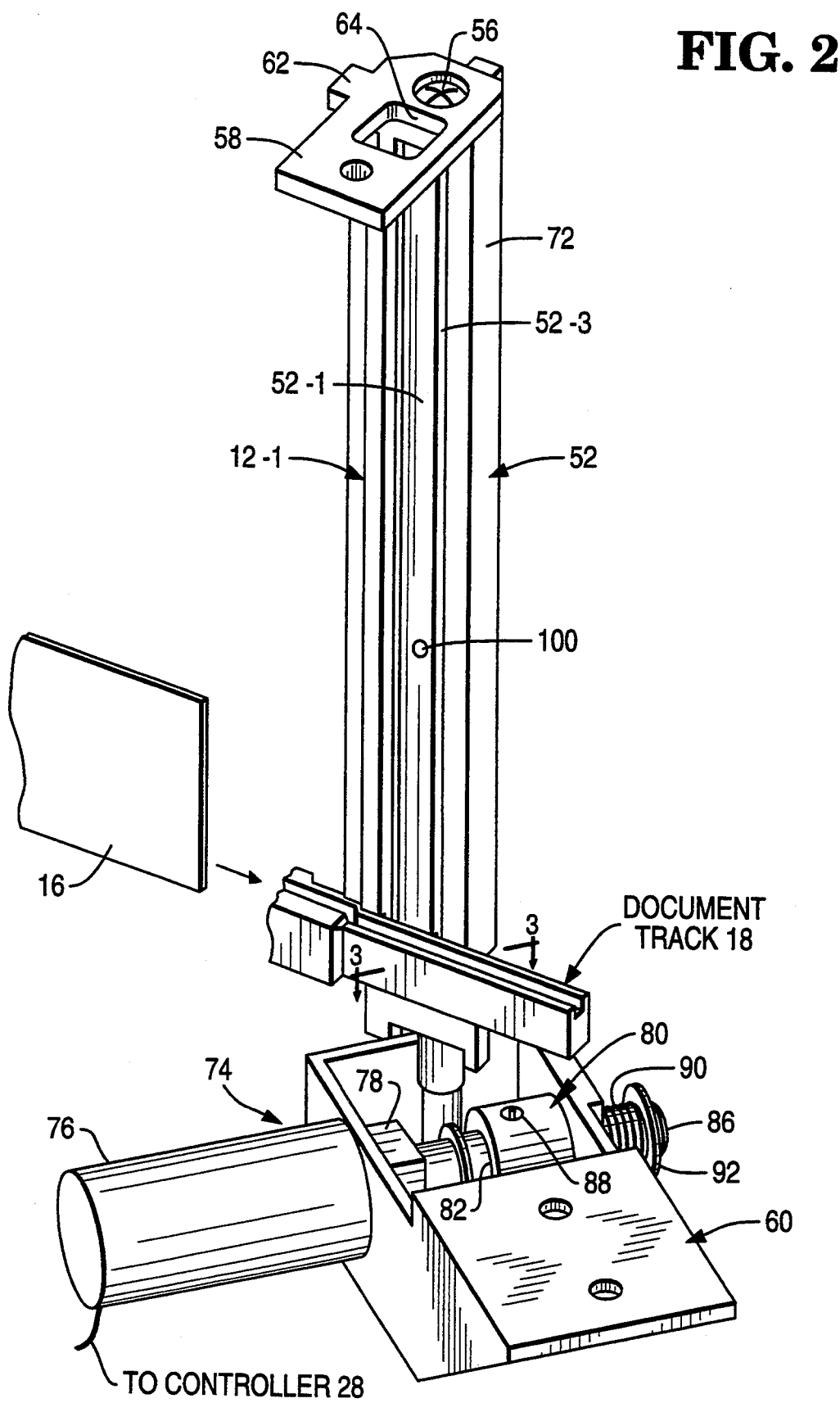
FIG. 2 is an isometric view of a portion of the calibration device shown in FIG. 1.

FIG. 2 shows an isometric view of the calibration device 12-1 which is used in association with the front camera 20. The document 16 is shown as entering the document track 18 so as to orient FIG. 2 with regard to what is shown in FIG. 1.

The apparatus or calibration device 12-1 includes a moveable member 52 which is moveable between first and second positions relative to the optical axis 54 of the front camera 20 as shown in FIG. 3. When in the first position, the moveable member 52 has a first reference member 52-1 which is positioned relative to the optical axis 54 of the front camera 20. In the embodiment described, the first reference member 52-1 is a black member, although for different applications, the colors used for the first and second reference members may change.

When the moveable member 52 is moved to the second position mentioned, a second member 52-2 having a lobed, planar reference member 52-3 thereon is positioned relative to the optical axis of the front camera 20 as shown by the dashed outline 52-3-1. In this second position, the reference member 52-3 is positioned perpendicular to the optical axis 54 of the front camera 20 as shown in FIG. 3 and is located in the plane of the best focus of the front camera 20. The second position is achieved by rotating the moveable member 52 through an angle of 38 degrees in a clockwise direction, as viewed in FIG. 3, in the embodiment described. The planar reference member 52-3 is a white reference member in the embodiment described, and it extends in a vertical direction, as shown in FIG. 2. The heights of the first and second reference members 52-1 and 52-2, respectively, are long enough to be used in height determination activities associated with the front camera 20.

The moveable member 52 is supported on a shaft 56 which has one end thereof mounted in a reference guide 58 (FIG. 2) and the remaining end thereof mounted in a box-like mounting member or frame 60. The reference guide 58 has a projection 62 which coacts, conventionally, with a portion of the document track 18 to maintain the moveable member in a direction which is perpendicular to the optical axis 54 of the front camera 20. The reference guide 58 has an opening 64 therein to enable a cleaning tool, like a cotton swab, to be inserted through the opening 64 to clean both the first and second reference members 52-1 and 52-2.

In a preferred embodiment, the moveable member 52 is made of a black longitudinally-aligned first half 52-1 and a white longitudinally-aligned second half 52-2 which are adhered together along a diametral line shown as dashed line 66 in FIG. 3. The resulting tubular moveable member 52 is then positioned on the shaft 56 and secured thereto. The calibration device 12-1 also includes vertical support members 68, 70, and 72 (FIG. 3) which are secured to the frame 60 (FIG. 2) and the reference guide 58 to provide support for the calibration device 12-1.

Figure 4:
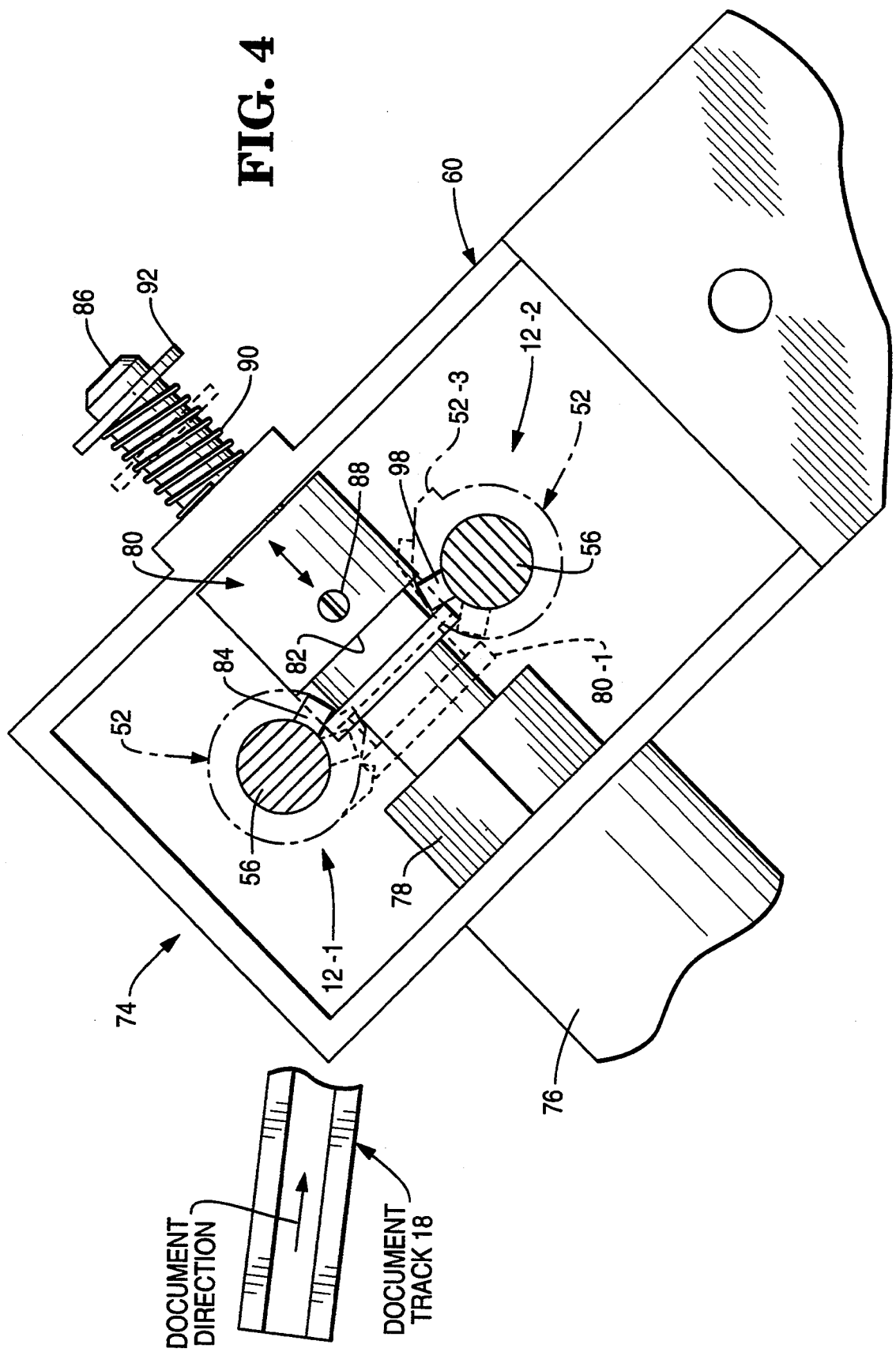
FIG. 4 is a plan view, with certain portions broken away, to show how a single actuator is used to position a white reference member and a black reference member with the associated optical axis of the front and rear cameras.

An actuator mechanism 74 for moving the moveable member 52 between the first and second positions mentioned, is shown best in FIG. 4. The actuator mechanism 74 includes an actuator or solenoid 76 which is secured to the frame 60 by a fastener 78. A coupling member 80 has an annular recess 82 therein to receive a pin 84 passing through the shaft 56 to rotate it. The coupling member 80 is secured to the operating shaft 86 of the solenoid 76 by a fastener 88 to be moved by the shaft 86. A compression resilient member or spring 90 is positioned between frame 60 and a "C" clip 92, and it is used to bias or move the coupling member 80 to the position shown in solid outline in FIG. 4. In this position, the moveable member 52 is in the first or home position shown in FIG. 3, with the planar reference member 52-3 being positioned out of the document track 18.

When the solenoid 76 is energized by the controller 28, the shaft 86, with the coupling member 80 thereon, is pulled inwardly, pulling the coupling member 80 to the position shown in dashed outline 80-1. During the pulling, the coupling member 80 (through the action of the coupling member 80 and the associated pin 84) moves or pivots the moveable member 52 in a clockwise direction (as viewed in FIG. 4) to move the planar reference member 52-3 into the document track 18, as shown by the dashed outline 52-3-1 in FIG. 3.

When the planar reference member 52-3 is in the second position shown in dashed outline 52-3-1 in FIG. 3, a tang 52-4 on the moveable member 52 abuts against a stop 94 to limit the rotation of the moveable member 52. Correspondingly, a shoulder on the planar reference member 52-3 abuts against a stop 96 to limit the rotation of the moveable member 52 to the first position when the solenoid 76 is de-energized and the spring 90 becomes effective.

The calibration device 12 may also include a second calibration device 12-2 which is identical in construction to the first calibration device 12-1 already described; accordingly, the same reference numbers used in calibration device 12-1 are used to identify similar parts in calibration device 12-2 except where otherwise noted.

The moveable member 52 of the second calibration device 12-2 is rotated (counter-clockwise) from the first position shown in solid outline in FIG. 3 to a second position shown in dashed outline so that the associated planar member 52-3 is positioned in the document track 18 (as at position 53-3-3) when calibration with the white reference member is desired. The second calibration device 12-2 is located downstream of the first calibration device 12-1 as far as the feeding direction of documents in the document track 18 is concerned. The planar member 52-3-1 has a ramp side 52-5-1 (shown in dashed outline) which directs an incoming document 16 in front of the planar member 52-3-1. The calibration device 12-2 has a pin 98 (FIG. 4) which couples the coupling member 80 to the associated moveable member 52.

A feature of this invention is that the moveable member 52 of each of the first and second devices 12-1 and 12-2 is actuated by the single solenoid 76 which is under the control of the controller 28. Calibration is performed with no documents in the track because damage to the document 16 could result by extreme bending if both of the planar reference members 52-3 were in the dashed position shown in FIG. 3.

Another feature of this invention is that there is a portion of the second reference member which is positioned on the first reference member. In the specific embodiment shown, a white portion 100 is located on the black reference member 52-1 as shown in FIG. 2, with the white portion 100 being located below the midpoint of the moveable member 52. Because the moveable members of the first and second devices 12-1 and 12-2 are identical, the moveable member 52 is inverted when installed for the second device 12-2 so that the white portion 100 is located above the midpoint of the associated moveable member. This is a help to a service person performing a test on the front camera 20 or the rear camera 24 and the associated circuitry. When calibration is not being performed, the solenoid 76 is in a de-energized state, permitting the first reference member 52 with the white portion 100 thereon to be viewed by the associated front or rear cameras 22 and 24. By monitoring the illumination of the white dot 100 on the first reference member 52-1, for example, the controller 28 can determine whether or not the light level is too high or too low. No documents are processed during a calibration procedure.

When the system 10 is turned on at the start of operations, a diagnostic test is performed. The software for performing the various tests may be downloaded from the host 48, for example, and stored in the RAM 38 of the controller 28. After a general diagnostic test is performed, the controller 28 energizes the solenoid 76 to move the planar reference member 52-3 into the document track 18 as previously described. The general steps are as follows:

1. The front camera 20 takes a picture of the white planar reference member 52-3 and compares the results to an original "picture" when the system 10 was initially built. If the current picture is similar to the original picture, as defined by predetermined limits, the system 10 is able to proceed with normal processing.
2. The gain of the front camera 20 is optimized. Some conventional video correction is performed to adjust to non-uniformities in the illumination profile of the scanning line of the camera.
3. The changes introduced in step 2 are then stored as an updated illumination profile for use at a subsequent start up; and
4. If the reference member 52-3 needs cleaning, a note to that effect is indicated on the display 42 to enable an operator to perform the cleaning as previously described.

What is claimed is

1. An apparatus comprising:
a generally cylindrical shaped moveable member (hereinafter referred to as moveable member) moveable via a pivoting movement in first and second opposing directions between first and second positions relative to an optical axis of an imaging device positioned at a document track; said moveable member having a first reference member thereon positioned relative to said optical axis when said moveable member is positioned in said first position, and said moveable member having a second reference member thereon positioned relative to said optical axis when said moveable member is positioned in said second position; and
an actuator mechanism for moving said moveable member between said first and second positions;
said first reference member having a portion of said second reference member thereon, with said first reference member and said portion of said second reference member being located on a same side facing said optical axis, with portion of said second reference member being surrounded by said first reference member, and with said portion of said second reference member being positioned on said first reference member between a midpoint of said moveable member and one end thereof.

2. The apparatus as claimed in claim 1 in which said actuator mechanism includes a resilient member which moves said moveable member to a first position which is a default position, and also includes an actuator for moving said moveable member to said second position.

3. The apparatus as claimed in claim 1 in which said actuator mechanism moves said second reference member from a downstream position to an upstream position relative to a feeding direction for a document in a document track and relative to said optical axis when said moveable member is moved to said second position.

4. The apparatus as claimed in claim 3 in which said first reference member is made of black material and said second reference member is made of white material.

5. The apparatus as claimed in claim 4 in which said moveable member is a cylindrical member which has a longitudinally aligned first half which is made of said black material and also has a longitudinally aligned second half which is made of said white material.

6. The apparatus as claimed in claim 5 in which said longitudinally aligned second half has a projection thereon which is advanced towards a middle of said document track.

7. An apparatus comprising:
a first moveable member moveable via a pivoting movement in first and second opposing directions between first and second positions relative to an optical axis of a first imaging camera positioned at a document track in which a document is feed in a feeding direction;
a second moveable member moveable via a pivoting movement in first and second opposing directions between a first position and a second position relative to an optical axis of a second imaging camera positioned at said document track;
said first moveable member having a first reference member thereon positioned relative to the first optical axis when said first moveable member is positioned in said first position, and said first moveable member having a second reference member thereon positioned relative to said first optical axis when said first moveable member is positioned in said second position;
said second moveable member having a first reference member thereon positioned relative to said second optical axis when said second moveable member is in said first position, and said second moveable member having a second reference member thereon positioned relative to said second optical axis when said second moveable member is positioned in said second position; and an actuator mechanism for moving said first and second moveable members between associated first and second positions, said actuator mechanism moving said first and second moveable members in opposite directions to enable said first and second moveable members to be moved to the associated said first positions.

8. The apparatus as claimed in claim 7 in which said actuator mechanism includes a resilient member which moves both said first and second moveable members to the associated said first position as a default position, and also includes an actuator which moves both said first and second moveable members to the associated said second position against a bias provided by said resilient member.

9. The apparatus as claimed in claim 8 in which said actuator mechanism includes a coupling member which is coupled to said first and second moveable members to simultaneously move said first and second members to the associated said second positions.

10. An apparatus comprising:
a first moveable member moveable between first and second positions relative to an optical axis of a first imaging camera positioned at a document track in which a document is feed in a feeding direction;
a second moveable member moveable between a first position and a second position relative to an optical axis of a second imaging camera positioned at said document track;
said first moveable member having a first reference member positioned relative to the first optical axis when said first moveable member is positioned in said first position, and said first moveable member having a second reference member positioned relative to said first optical axis when said first moveable member is positioned in said second position;
said second moveable member having a first reference member positioned relative to said second optical axis when said second moveable member is in said first position, and said second moveable member having a second reference member positioned relative to said second optical axis when said second moveable member is positioned in said second position; and
an actuator mechanism for moving said first and second moveable members between associated first and second positions;
said actuator mechanism including a resilient member which moves both said first and second moveable members to the associated said first position as a default position, and also including an actuator which moves both said first and second moveable members to the associated said second position against a bias provided by said resilient member;,
said actuator mechanism including a coupling member which is coupled to said first and second moveable members to simultaneously move said first and second members to the associated said second positions;
said first moveable member being positioned upstream from said second moveable member, and said first and second moveable members being positioned on opposite sides of said document track.

11. The apparatus as claimed in claim 7 in which each of said first and said second moveable members is cylindrically shaped and is mounted for pivotal movement between said first and second positions.

12. The apparatus as claimed in claim 7 in which said first reference member associated with said first and second moveable members is black and said second reference member associated with said first and second moveable members is white.

13. The apparatus as claimed in claim 7 in which each of said first and second moveable members is a cylindrical member which is pivotally mounted for pivotal movement between said first and second positions and each said cylindrical member has a longitudinally aligned first half which is made of black material and comprising the associated said first reference member and each said cylindrical member also has a longitudinally aligned second half which is made of white material comprising the associated said second reference member.

14. The apparatus as claimed in claim 13 in which said cylindrical member comprising each of said first and second moveable members has a portion of a said second reference member located on said first reference member and positioned between a midpoint of said cylindrically shaped member and one end thereof, with each said portion of a second reference member located on an associated first reference member being located on a same side facing the associated said optical axis.

15. An apparatus comprising:
a document track;
a document transport for moving a document in a feeding direction in said document track;
an imaging device positioned at said document track and having an optical axis positioned at a document moving therepast;
a generally cylindrically shaped moveable member (herein referred to as moveable member) moveable via a pivoting movement in first and second opposing rotations between first and second positions relative to said optical axis;
said moveable member having a first reference member positioned relative to said optical axis when said moveable member is positioned in said first position, and said moveable member having a second reference member positioned relative to said optical axis when said moveable member is positioned in said second position;
said first reference member having a portion of said second reference member thereon, with said first reference member and said portion of said second reference member being located on a same side facing said optical axis, and with said portion of said second reference member being surrounded by said first reference member; with said portion of said second reference member being positioned on said first reference member between a midpoint of said moveable member and one end thereof;
an actuator mechanism for rotating said moveable member between said first and second positions; and
a controller for controlling the operation of said imaging device to:
(b) energize said actuator mechanism to move said moveable member to said second position; and
(a) obtain a reading of an output from said imagine device when said second reference member is positioned relative to said optical axis and compare the reading with a reading obtained from an initial reading obtained from an initial set up of said apparatus.

* * * * *

UNITED STATES PATENT AND TRADEMARK OFFICE
CERTIFICATE OF CORRECTION

PATENT NO. : 5,386,299
DATED : January 31, 1995
INVENTOR(S) : Owen H. Wilson et al.

It is certified that error appears in the above-indentified patent and that said Letters Patent is hereby corrected as shown below:

Column 6, line 14, after "with" insert --said-- first occurrence.

Column 8, line 62, "imagine" should be --imaging--.

Signed and Sealed this

Eighteenth Day of April, 1995

Attest:

BRUCE LEHMAN

Attesting Officer

Commissioner of Patents and Trademarks